US011792320B2

(12) United States Patent  
Curtin et al.

(10) Patent No.: US 11,792,320 B2  
(45) Date of Patent: *Oct. 17, 2023

(54) METHODS FOR AUDITING COMMUNICATION SESSIONS

(71) Applicant: American TEL-A-Systems, Inc., McFarland, WI (US)

(72) Inventors: Thomas V. Curtin, Madison, WI (US); Kevin Mark Beale, Stoughton, WI (US); Daniel R. Cropp, McFarland, WI (US)

(73) Assignee: AMERICAN TEL-A-SYSTEMS, INC., McFarland, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,532

(22) Filed: Apr. 28, 2022

(65) Prior Publication Data

US 2022/0256034 A1 Aug. 11, 2022

Related U.S. Application Data

(63) Continuation of application No. 17/126,161, filed on Dec. 18, 2020, now Pat. No. 11,323,567, which is a
(Continued)

(51) Int. Cl.
*H04M 3/51* (2006.01)
*H04M 3/22* (2006.01)
*G10L 15/26* (2006.01)

(52) U.S. Cl.
CPC .......... *H04M 3/5175* (2013.01); *G10L 15/26* (2013.01); *H04M 3/2218* (2013.01); *H04M 3/5183* (2013.01)

(58) Field of Classification Search
CPC . H04M 3/5175; H04M 3/5183; H04M 3/2218
(Continued)

(56) References Cited

U.S. PATENT DOCUMENTS 6,959,079 B2  10/2005 Elazar
7,203,285 B2   4/2007 Blair
(Continued)

FOREIGN PATENT DOCUMENTS

CA    2197456 A1   2/1996
CN   102625005 A   8/2012
WO  2011063761 A1   6/2011

OTHER PUBLICATIONS

"Fujitsu Call Center System CCRM-1 Product Description", http://www.fujitsu.com/downloads/HK/ccrm_pd.pdf, Copyright © Fujitsu Limited, Jan. 2004, 29 pages.

*Primary Examiner* — Thjuan K Addy
(74) *Attorney, Agent, or Firm* — BAKER BOTTS L.L.P.

(57) ABSTRACT

A method comprises establishing a communication session between an agent and at least one of a caller and a called party. The method comprises establishing a communication session between an agent and at least one of a caller and a called party and monitoring the communication session for one or more audit triggers. The method comprises detecting the one or more audit triggers. The method comprises, in response to detecting the one or more audit triggers, sending a notification to a client, the notification identifying one or more communication session auditing procedures available for the communication session. The method comprises receiving, from the client in response to the notification, a request to audit the communication session using at least one of the available one or more communication session auditing procedures. The method comprises performing the requested at least one communication session auditing procedure.

26 Claims, 5 Drawing Sheets

Related U.S. Application Data continuation of application No. 16/668,379, filed on Oct. 30, 2019, now Pat. No. 10,917,524.

(58) Field of Classification Search
USPC ............ 379/265.06, 265.05, 265.11, 265.03, 379/266.1, 266.07
See application file for complete search history.

(56) References Cited

U.S. PATENT DOCUMENTS

| | | | |
|---|---|---|---|
| 7,376,902 B2 | 5/2008 | Lueckhoff | |
| 7,558,382 B2 | 7/2009 | Torres et al. | |
| 7,860,233 B2 | 12/2010 | Kaundinya et al. | |
| 8,219,401 B1 | 7/2012 | Pettay et al. | |
| 8,285,868 B2 | 10/2012 | Leiden et al. | |
| 8,345,831 B2 | 1/2013 | Anderson | |
| 8,467,518 B2 | 6/2013 | Blair | |
| 8,665,863 B2 | 3/2014 | Silverman | |
| 8,706,498 B2 | 4/2014 | George | |
| 8,761,376 B2 | 6/2014 | Pande et al. | |
| 8,908,856 B2 | 12/2014 | Kawashima et al. | |
| 8,958,541 B1 | 2/2015 | Cooper et al. | |
| 8,976,955 B2 | 3/2015 | Liberman Ben-Ami et al. | |
| 9,111,239 B2 | 8/2015 | Minert et al. | |
| 9,124,697 B2 | 9/2015 | Scott et al. | |
| 9,154,623 B1 | 10/2015 | Ouimette et al. | |
| 9,178,999 B1 | 11/2015 | Hegde et al. | |
| 9,313,328 B2 | 4/2016 | Vendrow et al. | |
| 9,374,848 B1 | 6/2016 | Jayaraman et al. | |
| 9,413,891 B2 | 8/2016 | Dwyer et al. | |
| 9,521,258 B2 | 12/2016 | Ripa et al. | |
| 9,699,312 B2 | 7/2017 | Kuhn et al. | |
| 9,781,267 B2 | 10/2017 | Beimes et al. | |
| 9,871,835 B2 | 1/2018 | O'Connor et al. | |
| 10,049,661 B2 | 8/2018 | Flaks et al. | |
| 10,375,071 B1 * | 8/2019 | Hydell | H04L 63/20 |
| 2001/0043697 A1 | 11/2001 | Cox et al. | |
| 2004/0152444 A1 | 8/2004 | Lialiamou | |
| 2006/0126817 A1 | 6/2006 | Beckett, II et al. | |
| 2008/0229384 A1 | 9/2008 | Hodgkinson et al. | |
| 2008/0250156 A1 | 10/2008 | Agarwal et al. | |
| 2010/0158237 A1 | 6/2010 | McCormack et al. | |
| 2014/0003598 A1 | 1/2014 | Kawashima et al. | |
| 2015/0003595 A1 | 1/2015 | Yaghi et al. | |
| 2015/0098561 A1 | 4/2015 | Etison et al. | |
| 2015/0378577 A1 | 12/2015 | Lum et al. | |
| 2017/0091390 A1 | 3/2017 | Joul | |
| 2018/0139327 A1 | 5/2018 | Kalathur et al. | |
| 2018/0167505 A1 | 6/2018 | Bird et al. | |

* cited by examiner

METHODS FOR AUDITING COMMUNICATION SESSIONS

PRIORITY

This nonprovisional application is a continuation under 35 U.S.C. § 120 of U.S. patent application Ser. No. 17/126,161 filed Dec. 18, 2020, now U.S. Pat. No. 11,323,567, which is a continuation of U.S. patent application Ser. No. 16/668,379 filed Oct. 30, 2019, now U.S. Pat. No. 10,917,524, and entitled "Methods For Auditing Communication Sessions" both of which are hereby incorporated by reference in their entirety.

TECHNICAL FIELD

The present disclosure relates, in general, to communication systems and, more particularly, to systems and methods for auditing communication sessions.

BACKGROUND

Call centers are designed to connect callers to agents or other company representatives for a variety of purposes. Business owners may require call center services to manage incoming calls, including calls from prospective and existing customers. Customer experiences with call centers are important to the success of the business. For example, if a prospective customer encounters difficulty being connected to the business' sales team, the business owner may lose a sale. For this reason, the ability to audit communication sessions (e.g., calls or web chats) is important to the success of the call center, as it allows clients of the call center to ensure that the quality of a caller's interaction with the call center is satisfactory. Systems have been developed to facilitate the handling of incoming calls to a call center. Some of these systems allow rudimentary forms of call auditing, such as permitting a client of a call center to listen to an ongoing communication between a caller and an agent in mute-mode. These systems, however, suffer from significant deficiencies. For example, existing approaches that only allow a client to listen in mute-mode are inherently limited to phone calls and, as such, are inapplicable to other types of communication sessions (e.g., text message, web chat, electronic mail, etc.). As a consequence, existing systems are unable to provide effective auditing functionality for these other types of communication sessions. Moreover, even if the communication session between a caller and an agent is a phone call, the client may not be available to listen to the call at the time of the communication session and may be prevented from auditing the communication session as a result. Thus, there is a need for systems and methods that make it possible to audit different types of communication sessions.

Existing approaches suffer from additional deficiencies. For instance, it can be difficult for clients of a call center to determine the best times to perform call auditing and even more challenging to determine which calls, out of all the calls received at the call center, should be audited. Existing systems generally rely on agent-initiated notification processes to alert a client that there is an ongoing communication session that the client may wish to audit. This is problematic for a number of reasons. For instance, agent-initiated notification processes are subjective and may be initiated inconsistently depending on the particular agent. As a result, clients may receive notifications regarding some communication sessions unnecessarily or not be notified in instances where it would have been appropriate to do so. This is a waste of the client's time and the system's resources and fails to provide for efficient and thorough call auditing. Thus, there is a need for improved systems and methods of communication session auditing that provide for accurate and efficient client notification.

As another example, existing systems fail to provide a client with options for auditing a call. Rather, the client is typically limited to a single method (e.g., listening to the communication session in mute-mode). If the client is not able to utilize the single method available, they are not able to audit the communication session. Thus, there is a need for improved systems and methods that provide flexibility with respect to call auditing methods and allow the client to audit the communication session in a way that is suitable in the particular circumstances of the client.

SUMMARY

To address the foregoing problems with existing approaches, disclosed is a system. The system comprises an applications server configured to communicatively couple to a softswitch. The applications server comprises processing circuitry. The processing circuitry is configured to monitor a communication session for one or more audit triggers, the communication session established between an agent and at least one of a caller and a called party. The processing circuitry is configured to detect one or more audit triggers and, in response to the detection of the one or more audit triggers, send a notification to a client, the notification identifying one or more communication session auditing procedures available for the communication session. The processing circuitry is configured to receive, from the client in response to the notification, a request to audit the communication session using at least one of the available one or more communication session auditing procedures. The processing circuitry is configured to perform the requested at least one communication session auditing procedure.

In certain embodiments, the processing circuitry may be configured to record audio associated with the communication session.

In certain embodiments, the notification may comprise a portion of the recorded audio associated with the communication session. The request to audit the communication session may comprise a request to stream a remainder of the recorded audio associated with the communication session. The processing circuity may be further configured to stream the recorded audio associated with the communication session to the client.

In certain embodiments, the processing circuitry may be configured to receive, from the client, a request to join the communication session and join the client in the communication session.

In certain embodiments, the request to audit the communication session may comprise a request to receive a transcript of the communication session. The processing circuiting may be configured to convert the recorded audio associated with the communication session to text, generate the transcript of the communication session, and send the transcript of the communication session to the client.

In certain embodiments, the processing circuitry may be configured to communicatively couple to a station associated with the agent. The station may comprise a graphical user interface. The communication session may be guided by a script presented to the agent on the graphical user interface. The script may comprise at least one prompt and a response associated with the at least one prompt. The request to audit the communication session may comprise a request to view the script concurrently with the agent. The processing circuitry may be further configured to stream a video of the script presented to the agent on the graphical user interface to the client in response to the request to view the script concurrently with the agent.

In certain embodiments, the one or more audit triggers may comprise at least one of a response to a component of a script, a speech recognition pattern, a keyword, a keystroke, and an agent alert.

Also disclosed is a method for communication session auditing. The method comprises establishing a communication session between an agent and at least one of a caller and a called party. The method comprises monitoring the communication session for one or more audit triggers. The method comprises detecting the one or more audit triggers. The method comprises, in response to detecting the one or more audit triggers, sending a notification to a client, the notification identifying one or more communication session auditing procedures available for the communication session. The method comprises receiving, from the client in response to the notification, a request to audit the communication session using at least one of the available one or more communication session auditing procedures. The method comprises performing the requested at least one communication session auditing procedure.

In certain embodiments, the method may comprise, in response to establishing the communication session, recording audio associated with the communication session.

In certain embodiments, the notification may comprise a portion of the recorded audio associated with the communication session. The request to audit the communication session may comprise a request to stream a remainder of the recorded audio associated with the communication session. Performing the requested at least one communication session auditing procedure may comprise streaming the recorded audio associated with the communication session to the client.

In certain embodiments, the method may comprise receiving, from the client, a request to join the communication session and joining the client in the communication session.

In certain embodiments, the request to audit the communication session may comprise a request to receive a transcript of the communication session. The method may comprise converting the recorded audio associated with communication session to text. The method may comprise generating a transcript of the communication session. The method may comprise sending the transcript of the communication session to the client.

In certain embodiments, the communication session may be guided by a script. The script may be presented to the agent on a graphical user interface of a station associated with the agent. The script may comprise at least one prompt and a response associated with the at least one prompt. The request to audit the communication session may comprise a request to view the script concurrently with the agent. The method may further comprise streaming a video of the script presented to the agent on the graphical user interface to the client in response to the request to view the script concurrently with the agent.

In certain embodiments, the notification may comprise one or more of a text message, an email, a push alert, and a paging message.

In certain embodiments, the one or more audit triggers may comprise at least one of a response to a component of a script, a speech recognition pattern, a keyword, a keystroke, and an agent alert.

Also disclosed is a non-transitory computer-readable medium. The non-transitory computer-readable medium comprises instructions that, when executed by a processor, are configured to perform a method for communication session auditing. The method comprises monitoring a communication session for one or more audit triggers, the communication session established between an agent and at least one of a caller and a called party. The method comprises detecting one or more audit triggers. The method comprises, in response to detecting the one or more audit triggers, sending a notification to a client, the notification identifying one or more communication session auditing procedures available for the communication session. The method comprises receiving, from the client in response to the notification, a request to audit the communication session using at least one of the available one or more communication session auditing procedures. The method comprises performing the requested at least one communication session auditing procedure.

In certain embodiments, the method may comprise, in response to establishing the communication session, recording audio associated with the communication session.

In certain embodiments, the notification may comprise a portion of the recorded audio associated with the communication session. The request to audit the communication session may comprise a request to stream a remainder of the recorded audio associated with the communication session. Performing the requested at least one communication session auditing procedure may comprise streaming the recorded audio associated with the communication session to the client.

In certain embodiments, the method may comprise receiving, from the client, a request to join the communication session. The method may comprise joining the client in the communication session.

Certain embodiments of the present disclosure may provide one or more technical advantages. For example, certain embodiments may advantageously enable auditing of different types of communication sessions. As another example, certain embodiments may provide for more accurate and efficient notification that a client should begin auditing a communication session, thereby conserving system resources and improving the quality of communication session auditing. As still another example, certain embodiments may advantageously provide increased flexibility, for example by allowing the client to choose a communication session auditing method that suits the client's needs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
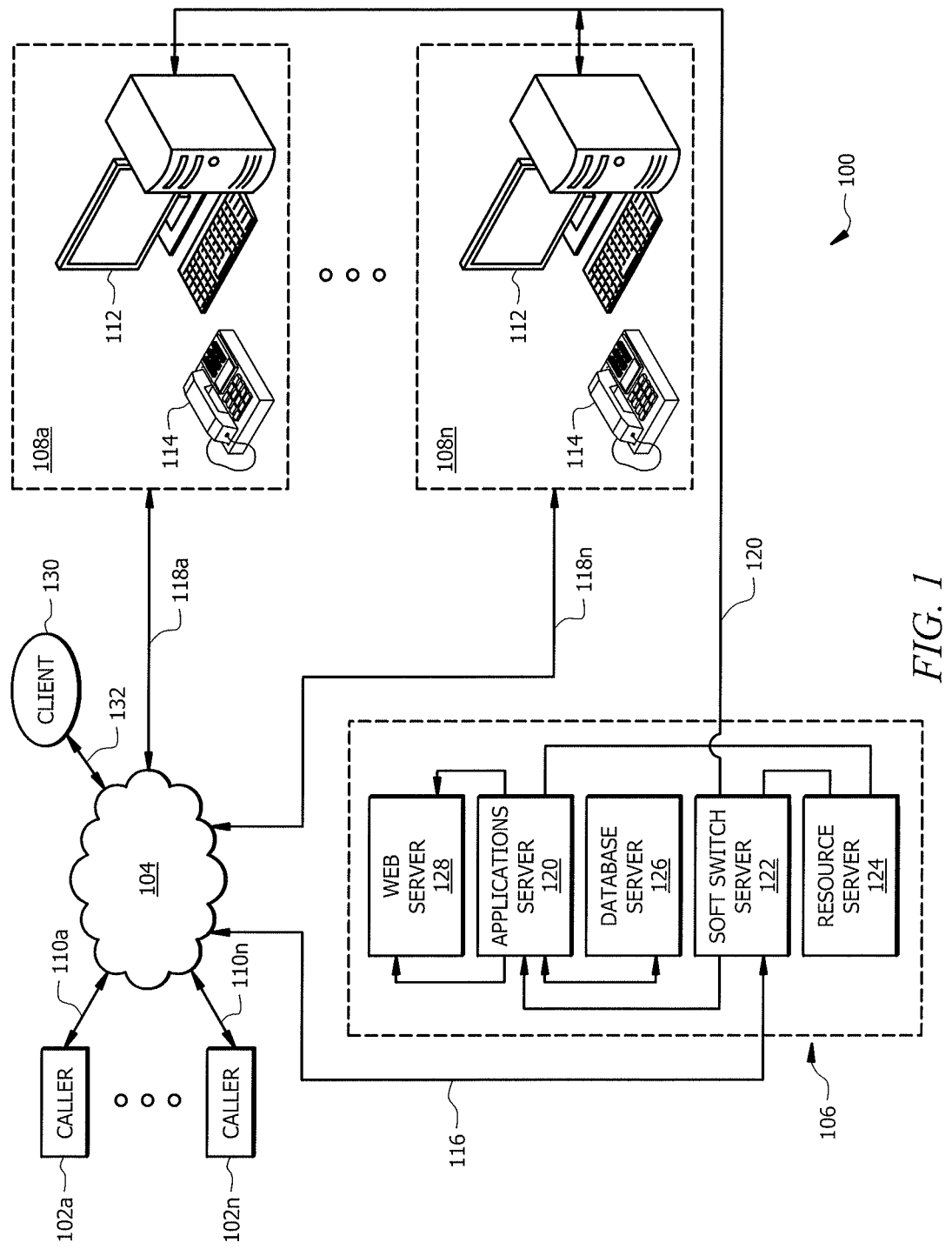
FIG. 1 is a block diagram of an example communication system, in accordance with certain embodiments.

As described above, systems have been developed to facilitate the handling of incoming calls to a call center. These systems, however, suffer from a number of significant deficiencies and inefficiencies related to communication session auditing. First, existing systems typically provide auditing for only a single type of communication session (e.g., phone calls) and fail to provide effective auditing functionality for other types of communication sessions. Second, existing systems typically rely on agent-initiated notification processes to alert a client that there is an ongoing communication session that the client may wish to audit. Such an approach may be inefficient and inaccurate and often results in wasting the client's time and system resources. Finally, existing systems fail to provide the client with flexibility with respect to methods for auditing a communication session.

The present disclosure contemplates various embodiments that may address these and other deficiencies associated with existing approaches. According to one example embodiment, a system is disclosed. The system comprises an applications server configured to communicatively couple to a softswitch. The applications server is configured to monitor a communication session between an agent and at least one of a caller and a called party for one or more audit triggers. The applications server is configured to detect one or more audit triggers and, in response to the detection of the one or more audit triggers, send a notification to a client. The notification may identify one or more communication session auditing procedures available for the communication session. The applications server is configured to receive, from the client in response to the notification, a request to audit the communication session using at least one of the available one or more communication session auditing procedures. The applications server is configured to perform the requested at least one communication session auditing procedure.

According to another example embodiment, a method is disclosed. The method comprises establishing a communication session between an agent and at least one of a caller and a called party. The method comprises establishing a communication session between an agent and at least one of a caller and a called party. The method comprises monitoring the communication session for one or more audit triggers. The method comprises detecting the one or more audit triggers. The method comprises, in response to detecting the one or more audit triggers, sending a notification to a client. The notification may identify one or more communication session auditing procedures available for the communication session. The method comprises receiving, from the client in response to the notification, a request to audit the communication session using at least one of the available one or more communication session auditing procedures. The method comprises performing the requested at least one communication session auditing procedure.

FIG. 1 is a block diagram of an example communication system 100, in accordance with certain embodiments. More particularly, FIG. 1 illustrates communication system 100 comprising one or more callers 102a-102n, a service platform 106, one or more operator stations 108a-108n, and one or more clients 130. Although FIG. 1 illustrates one example of communication system 100, it should be understood that this is for purposes of example only and the present disclosure is not limited to the example communication system of FIG. 1. Rather, the present disclosure contemplates that other embodiments of system 100 may be used without departing from the scope of the present disclosure.

In the example embodiment of FIG. 1, callers 102a-102n, service platform 106, operator stations 108a-108n, and client 130 are coupled to network 104 through various communications links (as described in more detail below). As used throughout this document, the term "couple" and/or "coupled" refers to any direct or indirect communication between two or more elements, whether or not those elements are in physical contact with one another. For example, each caller 102 may use any computing and/or communication device capable of enabling the communication of information to or from one or more of service platform 106, operator stations 108, and client 130 over network 104. Although referred to herein as a caller, it should be understood that callers 102 are not limited to individuals or devices that initiate a telephone call. Rather, the present disclosure contemplates that callers 102 may engage in a variety of types of communication sessions (e.g., telephone calls, video conferencing, text message, or web chat). It should also be understood that a caller 102 is not limited to a party initiating a communication session. For example, callers 102a-102n may be a calling party or a called party that communicates and/or receives data to and/or from service platform 106, operator stations 108, and/or client 130. Each caller 102 may use, for example, a telephone (e.g., a wireline telephone), a wireless device (e.g., a smartphone), a voice over Internet Protocol (IP) device, a desktop computer, a laptop computer, a personal digital assistant (PDA), a workstation, a mainframe computer, a mini-frame computer, a web server, or any other computing and/or communicating device.

Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Service platform 106 receives and/or communicates data (e.g., from or to callers 102a-102n, operator stations 108, and/or client 130) through network 104 coupled to service platform 106. In the example of FIG. 1, service platform 106 couples to network 104 through communications link 116. In certain embodiments, service platform 106 operates to collect, store, and/or communicate data to and/or from network 104. In certain embodiments, service platform 106 may be configured to integrate with, for example, telephone carriers and private branch exchange (PBX) equipment to provide a stand-alone, fully functional call center environment. In some cases, the carrier and PBX integration may be established using a Session Initiation Protocol (SIP) trunk integration method. In operation, service platform 106 may provide a full suite of call center and enterprise functionality.

The various elements of service platform 106 and exemplary functionality of service platform 106 are described in more detail below.

In the example embodiment of FIG. 1, system 100 also includes a plurality of operator stations 108a through 108n. Operator stations 108a through 108n are coupled to service platform 106 through communications link 120. Operator stations 108 are capable of receiving, collecting, storing, and/or communicating data to and/or from network 104. In the example embodiment of FIG. 1, operator stations 108a through 108n are coupled to network 104 through communications links 118a and 118n, respectively.

In certain embodiments, operator stations 108a through 108n may be comprised in a call center. For example, each operator station 108 may be a live agent-based data collection system capable of collecting data from, for example, caller 102 or client 130. Although operator station 108 is an agent-based system in the example embodiment of FIG. 1, the present disclosure contemplates that other suitable data collection system may be used without departing from the scope of the present disclosure.

As used herein, the term agent should be interpreted broadly to encompass any individual that caller 102 may be connected to, whether as part of an incoming call from caller 102 routed to service platform 106 or as part of an outgoing call transmitted from service platform 106 to a user (e.g., caller 102). As non-limiting examples, an agent may refer to an agent working in a call center (e.g., at one of operator stations 108), an employee of an organization associated with service platform 106 and/or operator stations 108, a technician (that may or may not be working remotely from a call center), or any other suitable person or entity. Although certain embodiments may describe an agent as an operator associated with an operator station 108 in a call center, the present disclosure is not limited to such an example embodiment. Rather, the various embodiments described herein may be applied to other suitable scenarios, such as those in which operator stations 108 do not make up a traditional call center (having a plurality of operator stations in one, centralized location). For example, in certain embodiments operator stations 108 may be distributed geographically and may couple to service platform 106 and caller 102 via one or more different networks.

Operator stations 108 may comprise any suitable computing and/or communicating device or combination of devices. In the example embodiment of FIG. 1, each operator station 108 includes a host 112 and a communication device 114. Communication device 114 enables an agent to communicate with caller 102. Communication device 114 may comprise, for example, a telephone, a wireless device, a voice over IP device, or any other computing and/or communicating device or combination of devices. Although the example embodiment of FIG. 1 illustrates host 112 and communication device 114 as separate devices, one device that is capable of performing the desired functionality could be used without departing from the scope of the present disclosure.

Host 112 may comprise, for example, a desktop computer, a laptop computer, a server computer, a personal digital assistant, and/or any other computing or communicating device or combination of devices. In certain embodiments, host 112 may be connected to a PBX-based automated call distribution (ACD) or an ACD of service platform 106. Host 112 may be configured to run software, such as a soft agent. The soft agent may, for example, include a SIP-based soft phone and switch-specific computer telephony integration (CTI) control of the agent state during call handling. The soft agent may provide an interface to service platform 106, and in particular to applications server 120 and softswitch server 122 of service platform 106. Host 112 may include a graphical user interface (GUI) that enables a live agent to collect, enter, process, store, retrieve, amend, and/or dispatch data during the interaction of operator station 108 with a user of caller 102 or client 130 (e.g., during a call). Host 112 may run console software that provides, for example, IP-based call handling using the GUI and, for example, an input device (such as a mouse, keyboard, microphone, or other suitable input device).

Each host 112 may be capable of executing and/or displaying one or more intelligent scripts and/or other types of scripts that at least partially contribute to the collection of data from caller 102. As described below, an intelligent script may guide call center agents through call completion steps.

Client 130 may be associated with a business or other entity that has engaged a call center to manage incoming and/or outgoing calls. In particular embodiments, client 130 may be responsible for auditing communication sessions associated with the call center (e.g., calls or texts to the call center or web chats through the business's website), as described in more detail below. In the example of FIG. 1, client 130 is coupled to network 104 through communications link 132. Like caller 102 described above, client 130 may use any computing and/or communication device capable of enabling the communication of information to or from one or more of service platform 106, operator stations 108, and callers 102 over network 104. For example, client 130 may use a telephone (e.g., a wireline telephone), a wireless device (e.g., a smartphone), a voice over IP device, a desktop computer, a laptop computer, a PDA, a workstation, a mainframe computer, a mini-frame computer, a web server, or any other computing and/or communicating device.

As noted above, in the example embodiment of FIG. 1 callers 102a-102n, service platform 106, operator stations 108-108n, and client 130 are coupled to network 104 through various communications links. More particularly, system 100 includes communications links 110, 116, 118, 120 and 132, each operable to facilitate the communication of data to and/or from network 104. Communications links 110, 116, 118, 120, and 132 may include any hardware, software, firmware, or combination thereof. In various embodiments, communications links 110, 116, 118, 120, and 132 may comprise communications media capable of assisting in the communication of analog and/or digital signals. Communications links 110, 116, 118, 120, and 132 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information.

Data may be transmitted over communications links 110, 116, 118, 120, 132 using any suitable protocol. As non-limiting examples, protocols such as the Real-time Transport Protocol (RTP) and WebRTC may be used. RTP is a network protocol for delivering audio and video over IP networks via streaming. WebRTC is an open framework for the web that enables high quality real-time communication sessions over a network. WebRTC allows for the streaming of audio and/or video media without requiring an intermediary or third-party software. RTP and WebRTC may be particularly useful in the various embodiments described herein, because they can advantageously allow for the receipt of real-time data from the communication session between caller 102 and an agent associated with an operator station 108, if desired. For example, as will be discussed in further detail below, client 130 may receive pre-recorded and/or real-time audio, a text feed from a communication session, and/or view a script guiding the agent associated with operator station 108 and responses from caller 102 in real-time.

As noted above, service platform 106 may provide a full suite of call center and enterprise functionality. Service platform 106 may comprise any suitable combination of hardware, software, and/or firmware. In certain embodiments, service platform 106 may comprise any device or combination of devices that may include one or more software and/or firmware modules. In the example embodiment of FIG. 1, service platform 106 includes an applications server 120, a softswitch server 122, a resource server 124, a database server 126, and a web server 128. Although FIG. 1 illustrates a particular arrangement of elements of service platform 106, it should be understood that the present disclosure is not limited to the precise arrangement of the example embodiment of FIG. 1. For example, although FIG. 1 illustrates an example embodiment in which applications server 120, softswitch server 122, resource server 124, database server 126, and web server 128 are incorporated into a single device, the present disclosure is not limited to this example embodiment. In certain embodiments, the elements of service platform 106 may be distributed. In certain embodiments, service platform 106 may contain fewer components than those illustrated in the example embodiment of FIG. 1. Additionally, in certain embodiments service platform 106 may contain any suitable additional components that may provide one or more of the functionalities described herein and/or additional functionality of service platform 106.

Applications server 120 may house one or more applications used by service platform 106. In certain embodiments, applications server 120 may provide a full suite of call center and enterprise applications. Exemplary call center and enterprise applications provided by applications server 120 are described in more detail below.

Softswitch server 122 is coupled to applications server 120 and resource server 124. Softswitch server 122 may house the switching components of service platform 106. For example, softswitch server 122 may include a softswitch. In certain embodiments, the softswitch may be a SIP-based telephony switch. The softswitch may receive inbound phone calls (e.g., from callers 102) and send outgoing call requests (e.g., outbound calls from operator stations 108). The softswitch may provide telephony services to, for example, IP subscribers and traditional PSTN subscribers, for example by supplying the trunking between the IP and PSTN networks. Softswitch server 122 may operate in tandem with applications server 120, resource server 124, database server 126, and web server 128 to provide voice processing and switching resources. For example, softswitch server 122 may provide one or more of intelligent call routing, switch-based configurable call control, multi-lingual voice processing resources, and other suitable functionality. In certain embodiments, softswitch 122 may stream audio to resource server 124 for processing (for example, using the speech recognition functionality of resource server 124, described in more detail below).

Resource server 124 is coupled to applications server 120 and softswitch server 122. Resource server 124 may operate in tandem with one or more of applications server 120, softswitch server 122, database server 126, and web server 128 to provide voice processing resources for service platform 106. For example, resource server 124 may provide a speech recognition engine and voice resources for service platform 106. Resource server 124 may include an automatic speech recognition (ASR) engine capable of processing voice responses, natural language processing, text-to-speech translations, and/or speech-to-text translations in connection with one or more voice-enabled functions of service platform 106. In certain embodiments, resource server 124 can be configured to use one or more customizable grammars to match spoken phrases to, for example, directory listings. Resource server 124 may be configured to receive audio from softswitch server 122 for processing using the speech-recognition functionalities described above.

Database server 126 is coupled to applications server 120. Database server 126 may store information utilized by one or more other elements of service platform 106 (such as applications server 120, softswitch server 122, resource server 124, and web server 128). For example, database server 126 may store one or more of speech-enabled intelligent scripts, intelligent scripts, scripts, prompts, information associated with a user (e.g., called or calling party), selections and data inputs from a user, recorded audio, transcripts of communication sessions, information associated with an audit trigger, speech recognition patterns, and any other suitable information. In certain embodiments, database 126 may use an SQL server database engine for database management, storage, and retrieval. Database server 126 may include memory capable of storing one or more scripts (speech-enabled intelligent scripts, intelligent scripts, and scripts), data associated with a user's response or responses, information related to previous interactions between a caller and service platform 106 and/or a caller and an agent, and/or any other suitable information. The memory may include any hardware, software, firmware, or combination thereof operable to store and facilitate retrieval of information. The memory may store information using any of a variety of data structures, arrangements, and/or compilations. The memory may, for example, include a dynamic random access memory (DRAM), a static random access memory (SRAM), a NAND flash memory, or any other suitable volatile or nonvolatile storage and retrieval device or combination of devices.

Data stored in database 126 may be accessible by multiple components of service platform 106 and/or operator stations 108 (including, for example, host 112 described in more detail below). For example, the data stored in database 126 may be accessible to one or more of applications server 120, softswitch server 122, resource server 124, web server 128, and host 112. Storing data in a memory that is accessible to multiple elements of system 100 can prove advantageous when it is desired to subsequently access and process this information. In certain embodiments, database 126 may store information about one or more audit triggers. In certain embodiments, data stored in database server 126 can be used to populate a speech-enabled intelligent script, and intelligent script, and/or any other type of script used by applications server 120 and/or an agent associated with an operator station 108. Populating scripts with data stored in database 126 can help the intelligent speech-enabled scripts (or an agent using an intelligent scripts) to interact more efficiently with a caller 102. For example, populating a speech-enabled intelligent script and/or a script used by a live agent with data from database 126 allows the intelligent speech-enabled script or the agent or operator to review the responses previously provided, which may allow the agent to better assist a caller 102. In certain embodiments, data stored in database server 126 can be used to perform communication session auditing.

Web server 128 provides the web services for service platform 106. In certain embodiments, service platform 106 may include all or some suitable combination of the servers described above, as well as (alternatively or in addition to) other elements configured to perform desired communicating and/or computing functionality.

Each of applications server 120, softswitch server 122, resource server 124, database server 126, and web server 128 may comprise any suitable combination of hardware, software, and firmware. In certain embodiments, one or more of applications server 120, softswitch server 122, resource server 124, database server 126, and web server 128 may include processing circuitry, such as a combination of one or more of a controller, microprocessor, microcontroller, central processing unit, digital signal processor, application-specific integrated circuit, field programmable gate array, or any other suitable computing device, resource, or combination of hardware, software, and/or encoded logic operable to provide the functionality described herein. The processing circuitry may execute instructions stored in device readable medium or in memory to provide the functionality described herein. Applications server 120, softswitch server 122, resource server 124, database server 126, and web server 128 may comprise any form of volatile or non-volatile computer readable memory including, for example, persistent storage, solid-state memory, remotely mounted memory, magnetic media, optical media, random access memory (RAM), read-only memory (ROM), mass storage media (for example, a hard disk), removable storage media (e.g., a flash drive, a Compact Disk (CD) or a Digital Video Disk (DVD)), and/or any other volatile, non-transitory device readable and/or computer executable memory devices that store information, data, and/or instructions that may be used by the processing circuitry. The memory may store any suitable instructions, data or information, including a computer program, software, an application including one or more of logic, rules, code, tables, etc. and/or other instructions capable of being executed by the processing circuitry to perform the various functionalities described herein. The memory may store responses written to memory by a script, such as an intelligent script or speech-enabled intelligent script. In some cases, the processing circuitry and device readable medium may be considered to be integrated.

In certain embodiments, one or more of applications server 120, softswitch server 122, resource server 124, database server 126, and web server 128 may run on dedicated servers. In other embodiments, one or more of applications server 120, softswitch server 122, resource server 124, database server 126, and web server 128 may run in a virtual server environment. Running applications server 120, softswitch server 122, resource server 124, database server 126, and web server 128 in a virtual server deployment may advantageously reduce the number of servers needed and provide greater flexibility in terms of redundancy and ease of deployment.

As noted above, applications server 120 may house one or more applications used by service platform 106 to provide a full suite of call center and enterprise applications. For example, applications server 120 may provide for ACD, such as skills-based routing ACD. This may advantageously enable service platform 106 to provide for functionality such as priority call routing, overflow, integral voice processing, reporting, and server-based PBX integration. In certain embodiments, applications server 120 may determine how incoming and/or outgoing calls should be routed, and provide instructions to softswitch server 122 to route calls in a particular manner.

As another example, applications server 120 may provide scripting functionality (e.g., intelligent scripting and/or speech-enabled intelligent scripting functionality). An intelligent script guides users through call completion steps, work flow steps, and messaging steps. Intelligent scripts can be built for call center agents, operators, and web and mobile users. Similarly, intelligent scripts guide call center agents through call completion steps. In certain embodiments, an intelligent script presents the appropriate options for each call type an agent handles, eliminating errors and reducing training time. One exemplary use of intelligent scripts is healthcare code calls. Call scripts guide agents through the specific requirements for code calls, eliminating errors, ensuring the codes are completed quickly, and self-documenting all steps taken to complete each code call.

Intelligent scripts may contain any number of elements, actions, and screens. In certain embodiments, a script designer enables an administrator (e.g., a call center administrator) to create any number of intelligent scripts. Each script may have a unique flow to present the elements, actions, and screens in the preferred order for each scenario. Branching and decision trees may be available within the scripts to customize the flow of elements based on selections, date/time, or data. In one particular non-limiting example, a script can comprise a series of queries requesting information and/or data from a user (e.g., caller 102) of service platform 106. In some cases, intelligent scripts may include, for example, an HTML-based script, an XML-based script, a JSON-based script, or a combination of these or other scripting formats. Intelligent scripts may comprise, for example, software, firmware, code, portions of code, data compilations, and/or a combination of these or any other type of data.

Speech-enabled intelligent scripts enable users (e.g., caller 102) to interact with intelligent scripts without agent involvement. Phone users are guided through scripts using pre-recorded prompts, voice menus, and text-to-speech menus. Phone users make selections and input data (e.g., using Dual Tone-Multi Frequency (DTMF) entry or speech recognition entry). In certain embodiments, the entire intelligent script may be speech-enabled. In certain embodiments, the script designer may enable the administrator to choose which entries are to be speech-enabled. In certain embodiments, the speech-enabled intelligent script (or a section thereof) may include prompts and/or questions similar to those in the intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions.

Speech-enabling intelligent scripts may advantageously create an opportunity to have a single script that presents speech-enabled input for a portion of the script, and screen-enabled input for another portion of the script. For example, in certain embodiments portions of an intelligent script that prompt a user for protected information may be speech-enabled. In certain embodiments, the speech-enabled intelligent script and the intelligent script executed by host 112 are generated from a common script stored in a memory accessible to the elements of service platform 106 (e.g., applications server 120) and operator stations 108 (e.g., in database server 126).

In certain embodiments, applications server 120 provides communication session auditing functionality. For example, applications server 120 may be configured to monitor a communication session established between an agent (e.g., an agent associated with an operator station 108) and a caller 102 for one or more audit triggers. The communication session may be any suitable type of communication session. As one example, the communication session may be an audio and/or video communication session (e.g., a telephone call or video conference). As another example, the communication session may be a written communication session (e.g., over text message or web chat). As still another example, the communication session may be a communication session established between a caller 102 and a speech-enabled intelligent script.

Applications server 120 may be configured to detect one or more audit triggers and, in response to detecting the one or more audit triggers, send a notification to client 130. In certain embodiments, applications server may be configured to send the notification to client 130 without agent-intervention. For example, upon detecting the one or more audit triggers, applications server 120 may automatically cause a notification to be sent to client 130. Such an approach may be particularly advantageous when the monitored communication session is between caller 102 and a speech-enabled intelligent script (which may be carried out without agent involvement). In certain embodiments, applications server 120 may be configured to notify an agent that one or more audit triggers have been detected. In such a scenario, the agent may initiate sending the notification to client 130.

The present disclosure contemplates that applications server 120 may be configured to monitor for and detect a variety of audit triggers and that any suitable type of audit trigger may be used. One example of an audit trigger that may be monitored for and detected by applications server 120 is a response to a component of a script. As noted above, a script may comprise a series of queries requesting information and/or data from a user (e.g., caller 102) of service platform 106. During a communication session, a caller 102 may provide responses to these queries. In certain embodiments, applications server 120 monitors the responses from caller 102 and may detect a response to be an audit trigger. In certain embodiments, applications server 120 may use speech recognition (which, in some cases, may be provided by resource server 124) to monitor responses from a caller 102.

Other types of audit triggers that may be monitored and detected by applications server 120 may include one or more of a speech recognition pattern, a keyword, a keystroke, an agent alert, and the stress level of caller 102. For example, in the case of a voice communication session applications server 120 may detect that either a caller 102 or an agent has used a particular keyword (e.g., "emergency" or "purchase") and detect that keyword as an audit trigger. As another example, in the case of a written communication session applications server 120 may detect that either a caller 102 or an agent has written a particular word (e.g., "emergency" or "purchase") and detect that keystroke as an audit trigger. As another example, in certain embodiments, an agent may determine that a particular communication session (e.g., one that is in process between caller 102 and the agent) should be audited by client 130. In such a scenario, the agent may send an alert to service platform 106 (e.g., using a host 112 of an operator station 108 associated with the agent) indicating that the communication session should be audited. Applications server 120 may receive the alert and detect the alert as an audit trigger. As still another example, applications server 120 may be configured to monitor the stress level in caller 102's voice (e.g., using speech recognition functionality of resource server 124) or other detected emotional cues. For instance, applications server 120 may determine that the stress level of caller 102's voice has increased above a threshold amount and detect the increased stress level as an audit trigger. Other speech recognition patterns that may be monitored and detected may include the volume of caller 102's voice, particular keywords, or other suitable speech recognition patterns.

As described above, applications server 120 may be configured to send a notification to client 130 in response to detecting the one or more audit triggers. In certain embodiments, applications server 120 may be configured to send a notification to client 130 in response to detecting a single audit trigger. In certain embodiments, applications server 120 may be configured to send a notification to client when a threshold number of triggers have been detected.

The notification may include a variety of information and may take a variety of forms, both of which may vary depending on particular implementations. In certain embodiments, the notification may be one or more of a text message, an email, a push alert, and a paging message. In some cases, applications server 120 may cause more than one notification to be sent (e.g., a text message and an email) in order to increase the likelihood that client 130 receives the notification.

In certain embodiments, applications server 120 may determine whether to notify client 130 using predictive intelligence functionality. For instance, in certain embodiments database server 126 may be configured to store information about previous interactions with client 130. The information may include, for example, information about communication sessions previously audited by client 130, such as the audit triggers detected by applications server 120, whether client 130 requested to audit the communication session after being notified by service platform 106, whether client 130 ultimately requested to join the communication session, and information about the communication session at the time when the client requested to join the communication session. Database server 126 may store other suitable information about the previous interactions, including other types of call analytics such as duration, disposition, identifying information about a caller 102, the type of communication session, or any other suitable information. Applications server 120 may be configured to use the information about previous interactions with client 130 (alone or in combination with other information, such as preference information for client 130, which may also be stored in database server 126) to self-learn and adjust as calls are processed. Applications server 120 employing predictive intelligence functionality may be configured to use one or more of the various information sources described above to predict a preferred behavior for subsequent calls.

For example, applications server 120 may determine based on information about previous interactions with client 130 that a notification should be sent in response to detecting a single trigger if, based on the information about previous interactions with client 130, client 130 has always requested to audit communication sessions that have invoked that trigger. This may advantageously enable applications server 120 to alert client 130 more quickly (e.g., by not waiting to detect any other triggers). As another example, if client 130 has repeatedly refused to audit a communication session in response to notifications prompted by a particular trigger, applications server 120 may determine to not notify client 130 in response to detecting that trigger when it otherwise would. By using predictive intelligence functionality, applications server 120 may advantageously tailor the communication session auditing process to the preferences of client 130.

In certain embodiments, the notification indicates one or more communication session auditing procedures available for the communication session and allows client 130 to select one of the available communication session auditing procedures to be used for auditing the communication session. In certain embodiments, applications server 120 may determine the available communication session auditing procedures prior to sending the notification. Applications server 120 may determine the available communication session auditing procedures based on one or more of a variety of criteria. For instance, in certain embodiments client 130 may set preferences for communication session auditing procedures (which may be stored in database server 126) and applications server 120 may determine the available communication session auditing procedures based on the preferences of client 130. Additionally or alternatively, applications server 120 may determine the available communication session auditing procedures based on the type of communication session established between caller 102 and the agent. For instance, certain communication session auditing procedures may be available for an audio communication session (e.g., a telephone call) that are not available for written communication sessions (e.g., communication sessions using text messages or web chat). Applications server 120 may determine the type of communication session established and determine the available communication session auditing procedures to be those applicable to the type of communication session established between caller 102 and the agent.

Exemplary communication session auditing procedures that may be used include, but are not limited to, joining client 130 to the communication session in real-time; streaming recorded audio of the communication session to client 130; streaming a video of the GUI associated with an agent's operator station 108 to client 130; providing a transcript of the call to client 130; and converting a text conversation to audio and providing the audio to client 130. These exemplary communication session auditing procedures are described in more detail below.

Applications server 120 may be configured to receive, from client 130 in response to the notification, a request to audit the communication session using at least one of the available one or more communication session auditing procedures. Application server 120 may be configured to perform the requested at least one communication session auditing procedure.

The present disclosure contemplates that a variety of communication session auditing procedures may be made available to client 130 and performed by applications server 120. As one example, client 130 may request to be joined (e.g., connected) to the communication session between caller 102 and the agent in real-time. If this communication session auditing procedure is available for the communication session, the above-described notification may include a link or button displaying the text "Join The Call" (or other suitable indication that this option is available to client 130). By selecting the link or button, a request to audit the communication session using this auditing procedure may be sent to service platform 106 and received at applications server 120. In response to receiving the request, applications server 120 performs the requested communication session auditing procedure by joining client 130 to the communication session between caller 102 and the agent in real-time. Client 130 may be joined to the communication session in a variety of ways. For example, in certain embodiments applications server 120 (in cooperation with softswitch server 122) may join client 130 in the communication session so that client 130 can immediately participate in the call between a caller 102 and an agent.

As another example, client 130 may request that service platform 106 stream recorded audio of the communication session to client 130. In certain embodiments, applications server 120 (alone or in combination with one or more of softswitch server 122 and resource server 124) may be configured to record audio associated with a communication session (e.g., beginning when the communication session is established between caller 102 and an agent). If this communication session auditing procedure is available for the communication session, the above-described notification may include a link or button displaying the text "Stream Call Audio" (or other suitable indication that this option is available to client 130). By selecting the link or button, a request to audit the communication session using this auditing procedure may be sent to service platform 106 and received at applications server 120. In response to receiving the request, applications server 120 performs the requested communication session auditing procedure by streaming recorded audio of the call to client 130. In certain embodiments, the notification may include a portion of the recorded audio. With this approach, client 130 is advantageously able to listen to the content of the communication session without having to immediately join the call. Client 130 may listen to the portion of the recorded audio and determine whether or not to audit the call further. If client 130 decides to audit the call and requests this auditing procedure, applications server 120 may stream the remainder of the recorded audio to client 130.

As another example, client 130 may request that service platform 106 stream a video of the content displayed on a GUI associated with the agent's operator station 108. As noted above, the communication session between caller 102 and the agent may be guided by a script presented to the agent on a GUI (e.g., a GUI of host 112 of operator station 108). The script may include prompts and associated responses that are populated as the communication session progresses. In certain embodiments, host 112 of an operator station 108 (or another suitable element of service platform 106, such as applications server 120) may be configured to record a video of the script displayed on the agent's GUI. If this communication session auditing procedure is available for the communication session, the above-described notification may include a link or button displaying the text "View Script Concurrently With Agent" (or other suitable indication that this option is available to client 130). By selecting the link or button, a request to audit the communication session using this auditing procedure may be sent to service platform 106 and received at applications server 120. In response to receiving the request, applications server 120 performs the requested communication session auditing procedure by streaming a video of the content displayed on the GUI associated with the agent's operator station 108 (e.g., the script prompts and associated responses) to client 130. This approach to communication session auditing advantageously allows client 130 to view the script concurrently with the agent, monitor the agent's progress through the script, and view the client's responses without having to join the communication session.

As another example, client 130 may request a transcript of the communication session. If this communication session auditing procedure is available for the communication session, the above-described notification may include a link or button displaying the text "View Transcript" (or other suitable indication that this option is available to client 130). By selecting the link or button, a request to audit the communication session using this auditing procedure may be sent to service platform 106 and received at applications server 120. In response to receiving the request, applications server 120 performs the requested communication session auditing procedure by sending a transcript of the communication session to the client. Applications server 120 may generate the transcript in a variety of ways. For example, if there is audio associated with the communication session (e.g., the communication session is a telephone call), applications server 120 may be configured to convert audio associated with a communication session to text and generate a transcript of the communication session. Applications server 120 may utilize speech-to-text recognition functionality (e.g., speech-to-text functionality of resource server 124) to convert the audio associated with the communication session to text. As another example, if there is no audio associated with the communication session (e.g., the communication session is over text message or web chat) then applications server 120 may forward the text associated with the communication session. Such an approach to communication session auditing may advantageously enable client 130 to audit the communication session even in circumstances that do not permit client 130 to listen to audio associated with a communication session. In certain embodiments, the transcript may be provided in real-time to client 130 (e.g., audio may be converted to text and sent to the client as it is received). In certain embodiments, applications server 120 may send a transcript of a completed communication session to client 130. With this approach, client 130 may advantageously be able to audit a call at a later time (for example, where the client could not audit the call at the time the notification was received).

As another example, client 130 may request that a written communication session be converted to an audio recording. As noted above, some communication sessions may be written (e.g., over text message or through web chat). Applications server 120 may be configured to convert the associated written messages to audio (e.g., using text-to-speech functionality of resource server 124). If this communication session auditing procedure is available for the communication session, the above-described notification may include a link or button displaying the text "Listen to Text" (or other suitable indication that this option is available to client 130). By selecting the link or button, a request to audit the communication session using this auditing procedure may be sent to service platform 106 and received at applications server 120. In response to receiving the request, applications server 120 performs the requested communication session auditing procedure by converting text associated with the communication session to audio and sending the audio to client 130. Such an approach may be advantages in circumstances where client 130 wishes to audit the communication session but is unable to read a transcript (e.g., if client 130 is driving and receiving the above-described notification on a mobile device).

As is evident from the above, certain of the communication session auditing methods described herein may advantageously enable client 130 to audit a communication session without joining the communication session immediately. For example, client 130 may request that recorded audio of the communication session be streamed to client 130, that a video of the GUI associated with an agent's station be streamed to client 130, that a transcript of the call be provided to client 130, or that text associated with the communication session be converted to audio and provided to client 130. As client 130 is auditing the communication session using one of the above-described communication session auditing procedures, it may become apparent to client 130 that client 130 should join the communication session established between caller 102 and the agent. Accordingly, in certain embodiments applications server 120 may be configured to provide client 130 with an option to join the communication session when one of these auditing procedures has been requested by client 130. For example, applications server 120 may deliver the requested audio, video, or transcript together with a link or button displaying the text "Join The Call" or, for other types of communication sessions, "Join the Chat" (or other suitable indication that this option is available to client 130 for a particular type of communication session). By selecting the link or button, a request to join the call may be sent to service platform 106 and received at applications server 120. In response to receiving the request, applications server 120 joins client 130 in the communication session in real-time (e.g., as described above).

In certain embodiments, applications server 120 may be configured to automatically join client 130 in the communication session. For instance, applications server 120 may be configured to continue monitoring the communication session for one or more additional triggers after client 130 has requested to audit the communication session. These additional triggers may be the same or a different set of triggers as the one or more audit triggers previously described. Information about the one or more additional triggers may be stored in database server 126. In response to detecting one or more additional triggers (e.g., a component of a script, a speech recognition pattern, a keyword, a keystroke, an agent alert, or other suitable trigger), applications server 120 may be configured to automatically join client 130 in the communication session (e.g., without agent or client intervention).

In certain embodiments, applications server 120 may use predictive intelligence functionality to determine whether to automatically join client 130 in the communication session using predictive intelligence functionality. As described above, applications server 120 may store a variety of information relating to previous interactions with, and/or preferences of, client 130. Applications server 120 may be configured to use the information about previous interactions with client 130 (alone or in combination with other information, such as preference information for client 130) to self-learn and adjust as calls are processed. Applications server 120 employing predictive intelligence functionality may be configured to use one or more of the various information sources described above to predict a preferred behavior for subsequent calls. For example, application server 120 may determine from the information about previous interactions with client 130 that client 130 has, while auditing previous communication sessions, requested to join a communication session after certain words or phrases have been used in the communication session. Based on this information, applications server 120 may recognize those words and/or phrases as additional triggers in subsequent communication sessions and automatically join client 130 into the communication session in response to detecting those words and/or phrases.

Additionally, applications server 120 may provide various voice services (alone or in combination with, for example, one or more of softswitch server 122 and resource server 124). For instance, applications server 120 may provide call center functions such as playing greetings to callers with multi-level navigation menus, playing automated call queuing announcements, playing automated agent greetings, automated call recording and playback, and other suitable functions. In certain embodiments, applications server 120 may provide for automated outbound phone calls (e.g., calls to one or more of callers 102) with messages played using integrated text-to-speech.

Other examples of services that service platform 106 provides may include (but are not limited to): call routing; call monitoring; database driven scripted messages (including intelligent speech-enabled scripts described above); call recording; directory services; status, event, on-call, and workforce scheduling tools; and event-driven statistical and analytical reporting for console operators as well as enterprise web users.

It should be appreciated that although certain functions of applications server 120 have been described above, these functions are described for purposes of example only. The present disclosure is not limited to the example embodiments described herein. In practice, applications server 120 may provide only a subset of the above-described functions, and in some cases applications server 120 may provide other suitable functionality for service platform 106.

Although certain exemplary embodiments have been described above in the context of handling an incoming telephone call, text message, or web chat received at a call center from caller 102, the present disclosure is not limited to these example embodiments. Rather, the present disclosure contemplates that the various embodiments described herein may be applied to outgoing communications (e.g., telephone calls, text messages, or web chats) initiated at the call center and directed to caller 102. Additionally, the various embodiments described herein are not limited to the exemplary forms of communication described and may be applied to other forms of communication. For example, the various embodiments described herein may be applied to multimedia communications (including, but not limited to, texting, chatting, and video communications). According to one example embodiment, a communication session may be established over a network, such as network 104, capable of delivering real-time audio and/or video media over IP networks via streaming without requiring an intermediary or third-party software, such as RTP and/or WebRTC. According to another example embodiment, a caller 102 may establish a communication session with an agent (e.g., an agent associated with a host 112 described above) using one of the above-described exemplary forms of multimedia communication or another suitable form of communication. In such a scenario, the called number may be an IP address, uniform resource locator (URL) or other information used to establish a multimedia communication session between the user and the agent. The communication session may be handled in accordance with the principles of the various embodiments described herein.

For instance, in certain embodiments a caller 102 may visit a web site associated with a company utilizing a call center including service platform 106 described above. In some cases, the web site may include a "Contact Us" button or other suitable mechanism to enable the user to initiate a communication session with an agent (e.g., via one of the forms of multimedia communication described above). As an alternative, the web site may include an automated prompt presented to the user to enable the user to establish a communication session with the agent (e.g., a chat, text, or video conversation). It should be understood, however, that other forms of establishing the communication session between caller 102 and an agent may be used.

Figure 2:
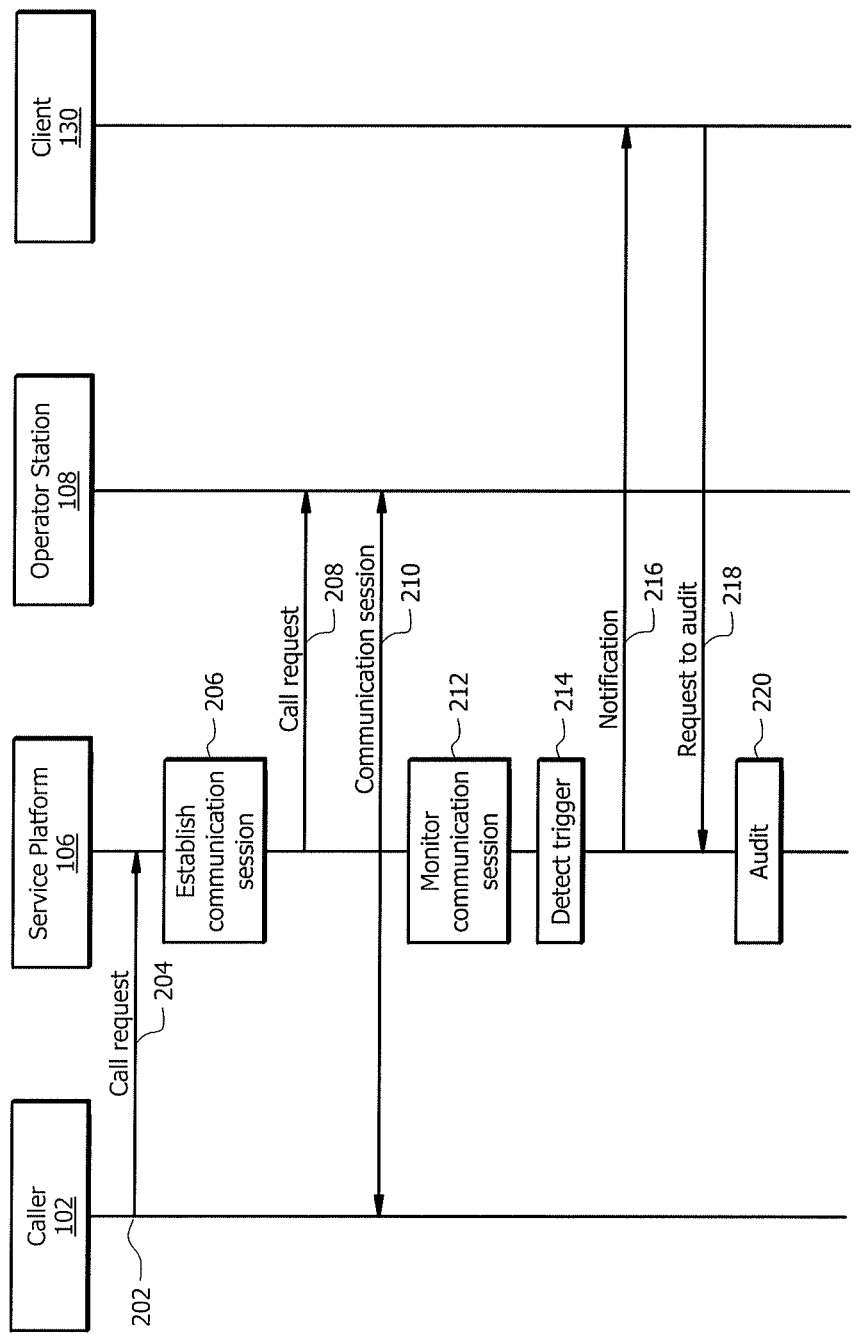
FIG. 2 is a signal diagram of an exemplary process for auditing a communication session, in accordance with certain embodiments.

FIG. 2 is an exemplary signal flow for auditing a communication session, in accordance with certain embodiments. In particular, FIG. 2 illustrates an exchange of signals among a caller 102, service platform 106, operator station 108, and client 130. At step 202, caller 102 initiates a call by sending a call request 204 that is routed to service platform 106. For example, caller 102 may initiate a call to a call center running service platform 106. At step 206, service platform 106 establishes a communication session 210 between caller 102 and an agent associated with an operator station 108. In particular, service platform 106 sends a call request 208 to operator station 108 to establish communication session 210.

At step 212, service platform 106 monitors the communication session for one or more audit triggers, for example as described above in relation to FIG. 1. At step 214, service platform 106 detects one or more audit triggers. As described above in relation to FIG. 1, in certain embodiments the one or more audit triggers may comprise at least one of a response to a component of a script, a speech recognition pattern, a keyword, a keystroke, and an agent alert. In certain embodiments, the one or more audit triggers may comprise the stress level of caller 102's voice.

In response to detecting the one or more audit triggers at step 214, service platform 106 sends notification 216 to client 130. In certain embodiments, notification 216 may comprise one or more of a text message, an email, a push alert, and a paging message. As described above in relation to FIG. 1, notification 216 identifies one or more communication session auditing procedures available for communication session 210. As described above in relation to FIG. 1, service platform 106 may determine the one or more communication session auditing procedures to include in notification 216 based on one or more suitable criteria. For example, in some cases service platform 106 may determine the one or more communication session auditing procedures to include in notification 216 based on the type of communication session established between caller 102 and operator station 108. As another example, service platform may determine the one or more communication session auditing procedures to include in notification 216 based on one or more preferences of client 130 (e.g., one or more preferences stored in database server 126).

At step 220, service platform 106 receives, from client 130 in response to notification 212, a request 218 to audit the communication session using at least one of the available one or more communication session auditing procedures. At step 220, service platform 106 performs the requested at least one communication session auditing procedure. For example, service platform 106 may perform one or more of the communication session auditing procedures described above in relation to FIG. 1 or below in relation to FIGS. 3-5.

Figure 3:
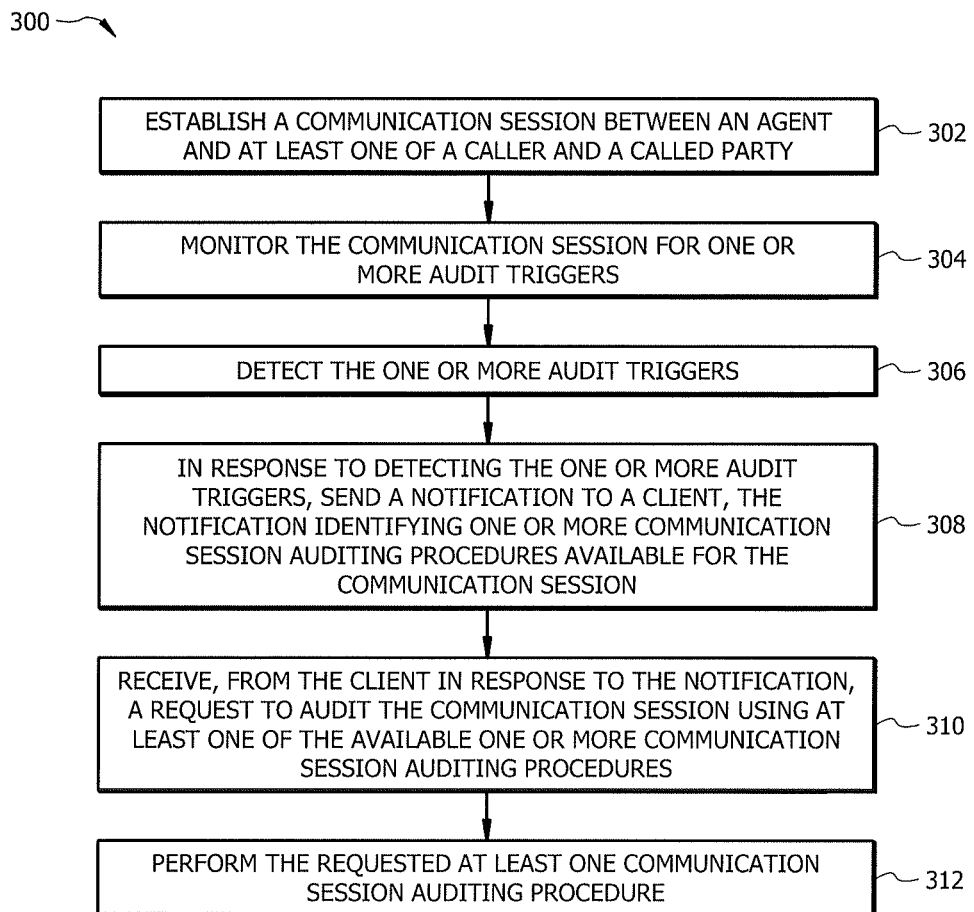
FIG. 3 is a flow diagram of an exemplary method for auditing a communication session, in accordance with certain embodiments.

FIG. 3 is a flow diagram of an exemplary method for auditing a communication session, in accordance with certain embodiments. In certain embodiments, the method may be performed by a call center service platform (e.g., service platform 106 described above in relation to FIG. 1 above). The method begins at step 302, where a communication session is established between an agent and at least one of a caller and a called party. At step 304, the communication session is monitored for one or more audit triggers. In certain embodiments, the one or more audit triggers may comprise at least one of: a response to a component of a script; a speech recognition pattern; a keyword; a keystroke; and an agent alert. In certain embodiments, the one or more audit triggers may comprise the stress level of a caller's voice.

At step 306, one or more audit triggers are detected. At step 308, in response to detecting the one or more audit triggers, a notification is sent to a client. In certain embodiments, the notification identifies one or more communication session auditing procedures available for the communication session. In certain embodiments, the notification may comprise one or more of: a text message; an email; a push alert; and a paging message.

At step 310, a request to audit the communication session using at least one of the available one or more communication session auditing procedures is received from the client in response to the notification. At step 312, the requested at least one communication session auditing procedure is performed.

In certain embodiments, the method may comprise, in response to establishing the communication session, recording audio associated with the communication session.

In certain embodiments, the notification may comprise a portion of the recorded audio associated with the communication session. The request to audit the communication session may comprise a request to stream a remainder of the recorded audio associated with the communication session. Performing the requested at least one communication session auditing procedure may comprise streaming the recorded audio associated with the communication session to the client. In certain embodiments, the method may further comprise receiving, from the client, a request to join the communication session and joining the client in the communication session.

In certain embodiments, the request to audit the communication session may comprise a request to receive a transcript of the communication session. The method may further comprise converting the recorded audio associated with the communication session to text, generating a transcript of the communication session, and sending the transcript of the communication session to the client.

In certain embodiments, the communication session may be guided by a script. The script may be presented to the agent on a graphical user interface of a station associated with the agent. The script may comprise at least one prompt and a response associated with the at least one prompt. The request to audit the communication session may comprise a request to view the script concurrently with the agent. The method may further comprise streaming a video of the script presented to the agent on the graphical user interface to the client in response to the request to view the script concurrently with the agent.

Figure 4:
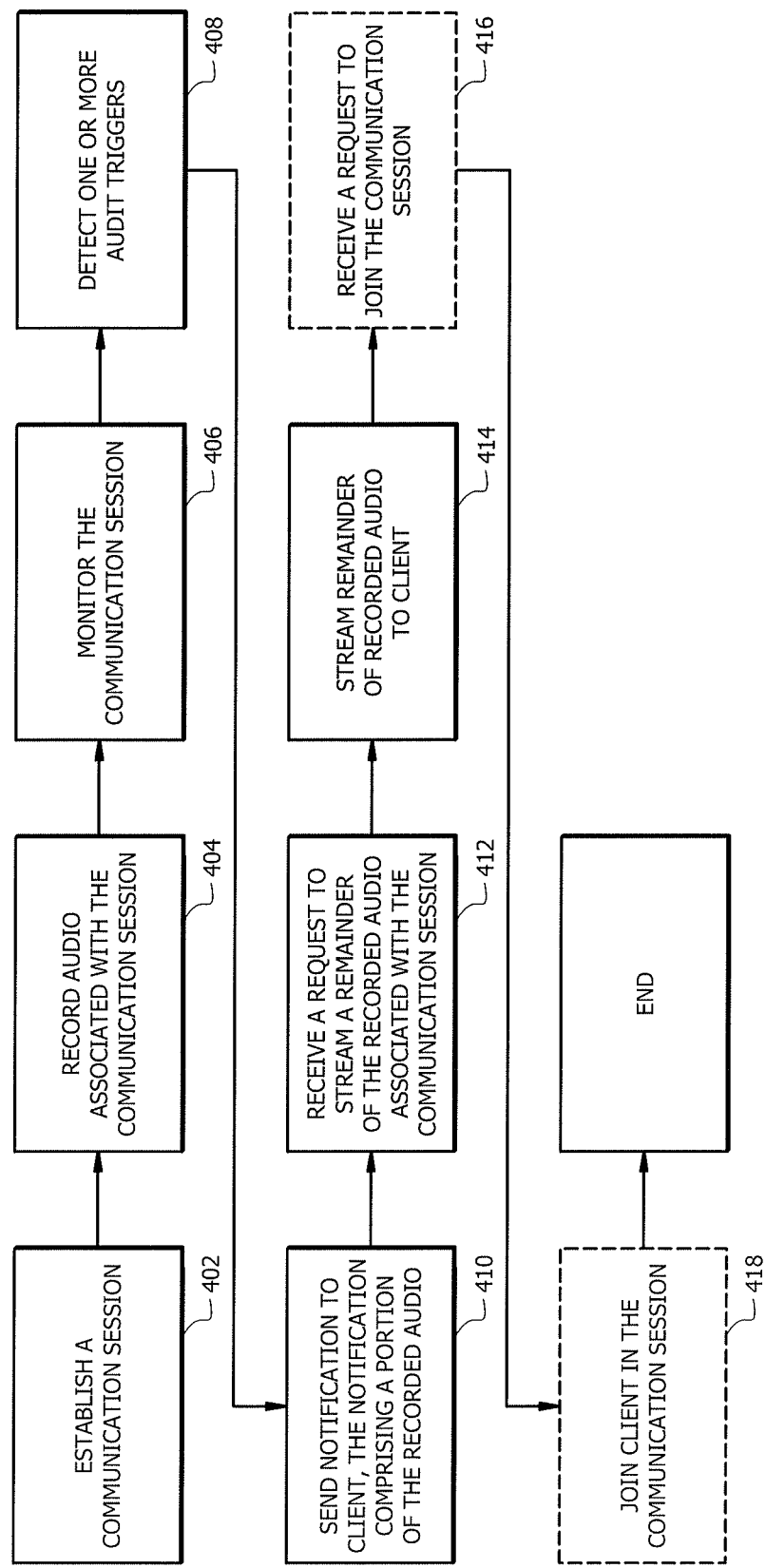
FIG. 4 is a flow diagram of an exemplary process for auditing a communication session, in accordance with certain embodiments.

FIG. 4 is a flow diagram of an exemplary process for auditing a communication session, in accordance with certain embodiments. At block 402, a service platform (e.g., in a call center) establishes a communication session between an agent and at least one of a caller and a called party. At block 404, in response to establishing the communication session, the service platform records audio associated with the communication session.

At block 406, the service platform monitors the communication session for one or more audit triggers. In certain embodiments, the one or more audit triggers may comprise at least one of a response to a component of a script, a speech recognition pattern, a keyword, a keystroke, and an agent alert. In certain embodiments, the one or more audit triggers may comprise the stress level of a caller's voice. In certain embodiments, the service platform may use a voice recognition engine to evaluate speech recognition patterns, keywords, and stress levels.

At block 408, the service platform detects the one or more audit triggers. At block 410, in response to detecting the one or more audit triggers, the service platform sends a notification to a client, the notification identifying one or more communication session auditing procedures available for the communication session. In the exemplary process of FIG. 4, the notification comprises a portion of the recorded audio associated with the communication session. In certain embodiments, the notification may be one of a text message, an email, a push alert, and a paging message. In certain embodiments, more than one notification may be sent (e.g., to different devices and/or addresses associated with the client).

At block 412, the service platform receives, from the client in response to the notification, a request to audit the communication session using at least one of the available one or more communication session auditing procedures. In the exemplary embodiment of FIG. 4, the request to audit the communication session comprises a request to stream a remainder of the recorded audio associated with the communication session.

At block 414, the service platform performs the requested at least one communication session auditing procedure. In the exemplary embodiment of FIG. 4, the service platform streams the remainder of the recorded audio associated with the communication session to the client. In certain embodiments, the service platform receives, from the client, a request to join the communication session at block 416. In certain embodiments, at block 418, the service platform joins the client in the communication session.

Figure 5:
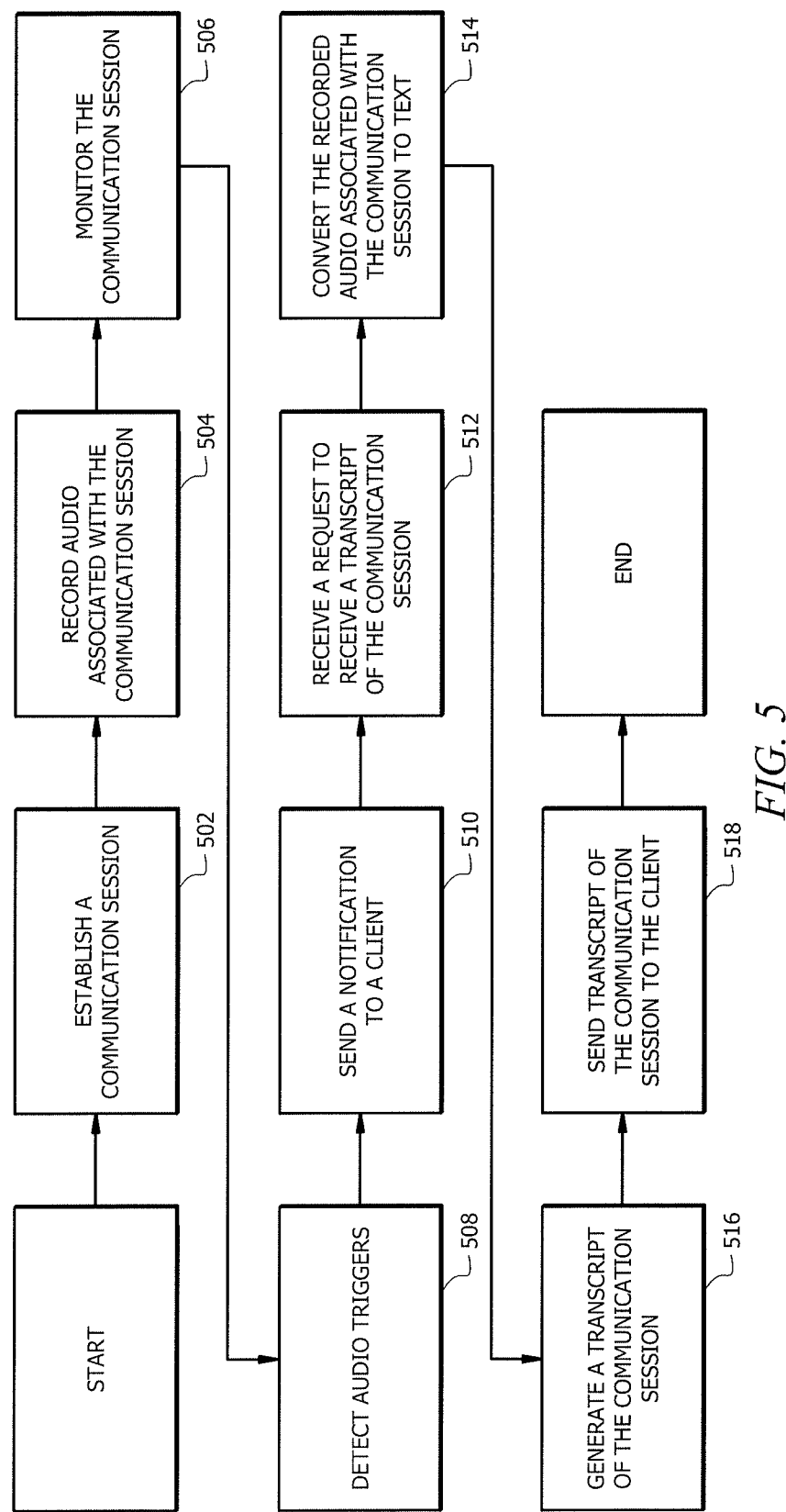
FIG. 5 is a flow diagram of another exemplary process for auditing a communication session, in accordance with certain embodiments.

FIG. 5 is a flow diagram of another exemplary process for auditing a communication session, in accordance with certain embodiments. The process of FIG. 5 begins in an analogous manner to that described above in relation to FIG. 4. More particularly, the process of FIG. 5 begins at block 502, where a service platform establishes a communication session between an agent and at least one of a caller and a called party. In the exemplary embodiment of FIG. 5, the service platform, in response to establishing the communication session, records audio associated with the communication session at block 504.

At block 506, the service platform monitors the communication session for one or more audit triggers. In certain embodiments, the one or more audit triggers may comprise at least one of a response to a component of a script, a speech recognition pattern, a keyword, a keystroke, and an agent alert. In certain embodiments, the one or more audit triggers may comprise the stress level of a caller's voice. In certain embodiments, the service platform may use a voice recognition engine to evaluate speech recognition patterns, keywords, and stress levels.

At block 508, the service platform detects the one or more audit triggers. In response to detecting the one or more audit triggers, the service platform sends a notification to a client at block 510. The notification identifies one or more communication session auditing procedures available for the communication session. In certain embodiments, the notification may comprise one or more of a text message, an email, a push alert, and a paging message. At block 512, the service platform receives, from the client in response to the notification, a request to audit the communication session using at least one of the available one or more communication session auditing procedures. In the exemplary embodiment of FIG. 5, the request to audit the communication session comprises a request to receive a transcript of the communication session.

At block 514, the service platform performs the requested at least one communication session auditing procedure. In the exemplary embodiment of FIG. 5, the service platform converts the recorded audio associated with the communication session to text. In certain embodiments, the service platform may use a speech recognition engine (e.g., a speech recognition engine of resource server 124 described above in relation to FIG. 1) to perform speech-to-text translations of the communication session to convert the recorded audio associated with the communication session to text. At block 516, the service platform generates a transcript of the communication session. At block 518, the service platform sends the transcript of the communication session to the client.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A system, comprising:
   an applications server configured to communicatively couple to a softswitch, the applications server comprising processing circuitry configured to:
   detect one or more audit triggers in a communication session;
   in response to the detection of the one or more audit triggers, send a notification to a client, the notification identifying one or more communication session auditing procedures available for the communication session;
   receive, from the client in response to the notification, a request to audit the communication session; and
   in response to the received request to audit the communication session, stream audio associated with the communication session to the client.

2. The system of claim 1, wherein the processing circuitry is configured to stream the audio associated with the communication session to the client in real-time.

3. The system of claim 1, wherein the processing circuitry is configured to stream the audio associated with the communication session to the client in real-time using real-time transport protocol (RTP).

4. The system of claim 1, wherein the audio associated with the communication session is pre-recorded.

5. The system of claim 1, wherein the processing circuitry is configured to stream the audio associated with the communication session to a resource server for speech-to-text processing.

6. The system of claim 1, wherein the processing circuitry is configured to stream the audio associated with the communication session to the client without joining the client in the communication session.

7. The system of claim 1, wherein the processing circuitry is configured to:
   receive, from the client, a request to join the communication session; and
   join the client in the communication session.

8. A method for communication session auditing, comprising:
   detecting one or more audit triggers in a communication session;
   in response to detecting the one or more audit triggers, sending a notification to a client, the notification identifying one or more communication session auditing procedures available for the communication session;
   receiving, from the client in response to the notification, a request to audit the communication session; and
   in response to receiving the request to audit the communication session, streaming audio associated with the communication session to the client.

9. The method of claim 8, wherein the audio associated with the communication session is streamed to the client in real-time.

10. The method of claim 8, wherein the audio associated with the communication session is streamed to the client in real-time using real-time transport protocol (RTP).

11. The method of claim 8, wherein the audio associated with the communication session is pre-recorded.

12. The method of claim 8, further comprising streaming the audio associated with the communication session to a resource server for speech-to-text processing.

13. The method of claim 8, wherein the audio associated with the communication session is streamed to the client without joining the client in the communication session.

14. The method of claim 8, further comprising:
   receiving, from the client, a request to join the communication session; and
   joining the client in the communication session.

15. A client device, comprising:
   processing circuitry, the processing circuitry configured to:
   receive a notification identifying one or more communication session auditing procedures available for a communication session;
   send, in response to a user input associated with the notification, a request to audit the communication session; and
   receive, in response to the request to audit the communication session, audio associated with the communication session at the client device.

16. The client device of claim 15, wherein the audio associated with the communication session is received in real-time.

17. The client device of claim 15, wherein the audio associated with the communication session is received in real-time using real-time transport protocol (RTP).

18. The client device of claim 15, wherein the audio associated with the communication session is pre-recorded.

19. The client device of claim 15, wherein the processing circuitry is configured to receive the audio associated with the communication session without joining the communication session.

20. The client device of claim 15, wherein the processing circuitry is configured to:
send, from the client device, a request to join the communication session; and
join the communication session.

21. A method for communication session auditing, comprising:
receiving, at a client device, a notification identifying one or more communication session auditing procedures available for a communication session;
sending, in response to a user input associated with the notification, a request to audit the communication session; and
receiving, in response to the request to audit the communication session, audio associated with the communication session at the client device.

22. The method of claim 21, wherein the audio associated with the communication session is received in real-time.

23. The method of claim 21, wherein the audio associated with the communication session is received in real-time using real-time transport protocol (RTP).

24. The method of claim 21, wherein the audio associated with the communication session is pre-recorded.

25. The method of claim 21, wherein the audio associated with the communication session is received at the client device without joining the communication session.

26. The method of claim 21, further comprising:
sending, from the client device, a request to join the communication session; and
joining the communication session.

* * * * *